(12) United States Patent
Lastowski

(10) Patent No.: US 6,382,351 B1
(45) Date of Patent: May 7, 2002

(54) SOUND REDUCING PANEL FOR ANIMAL HOUSING ROOMS

(75) Inventor: Philip A. Lastowski, Millersville, PA (US)

(73) Assignee: Lab Products, Inc., Seaford, DE (US)

( * ) Notice: Subject to any disclaimer, the term of this patent is extended or adjusted under 35 U.S.C. 154(b) by 0 days.

(21) Appl. No.: 09/434,073

(22) Filed: Nov. 5, 1999

(51) Int. Cl.[7] .................................................. E04B 1/82
(52) U.S. Cl. ....................... 181/295; 119/168; 119/526; 119/416
(58) Field of Search ................................ 181/295, 287, 181/290, 291, 292, 293, 284, 30, 198; 119/168, 526, 416, 527

(56) References Cited

U.S. PATENT DOCUMENTS

| | | | | |
|---|---|---|---|---|
| 2,488,555 A | * | 11/1949 | Paré | 181/33 |
| 3,822,762 A | * | 7/1974 | Crispin et al. | 181/33 |
| 3,942,306 A | * | 3/1976 | Kulka | 54/80 |
| 4,194,329 A | * | 3/1980 | Wendt | 52/145 |
| 4,442,585 A | * | 4/1984 | McGehee, Sr. et al. | 29/432 |
| 4,671,841 A | * | 6/1987 | Stephens | 156/292 |
| 4,807,563 A | * | 2/1989 | Berry et al. | 119/1 |
| 5,203,282 A | * | 4/1993 | Hasiuk | 119/168 |
| 5,418,340 A | * | 5/1995 | Wambolt | 181/290 |
| 5,565,254 A | * | 10/1996 | Norvell | 428/71 |
| 5,582,135 A | * | 12/1996 | Bellows | 119/168 |
| 5,712,038 A | * | 1/1998 | Yamazaki et al. | 428/411.1 |
| 5,759,659 A | * | 6/1998 | Sanocki et al. | 428/74 |
| 5,780,785 A | * | 7/1998 | Eckel | 181/295 |
| 5,881,677 A | * | 3/1999 | Schmitt | 119/526 |

* cited by examiner

Primary Examiner—Robert E. Nappi
Assistant Examiner—Edgardo San Martin
(74) Attorney, Agent, or Firm—Stroock & Stroock & Lavan LLP

(57) ABSTRACT

A sound reducing system comprises a housing, acoustic baffle, and acoustic netting. The acoustic baffle is covered with a waterproof protective casing which protects the acoustic baffle from dirt and moisture without interfering with its acoustic properties, and allows it to be cleaned with fluids. The housing comprises an inner pan and an outer pan which are pivotally coupled. The acoustic baffle and the acoustic netting are disposed within the housing, but can be removed for cleaning when the housing is opened. When the acoustic baffle and acoustic netting members are placed back within the housing, they are protected from damage.

3 Claims, 3 Drawing Sheets

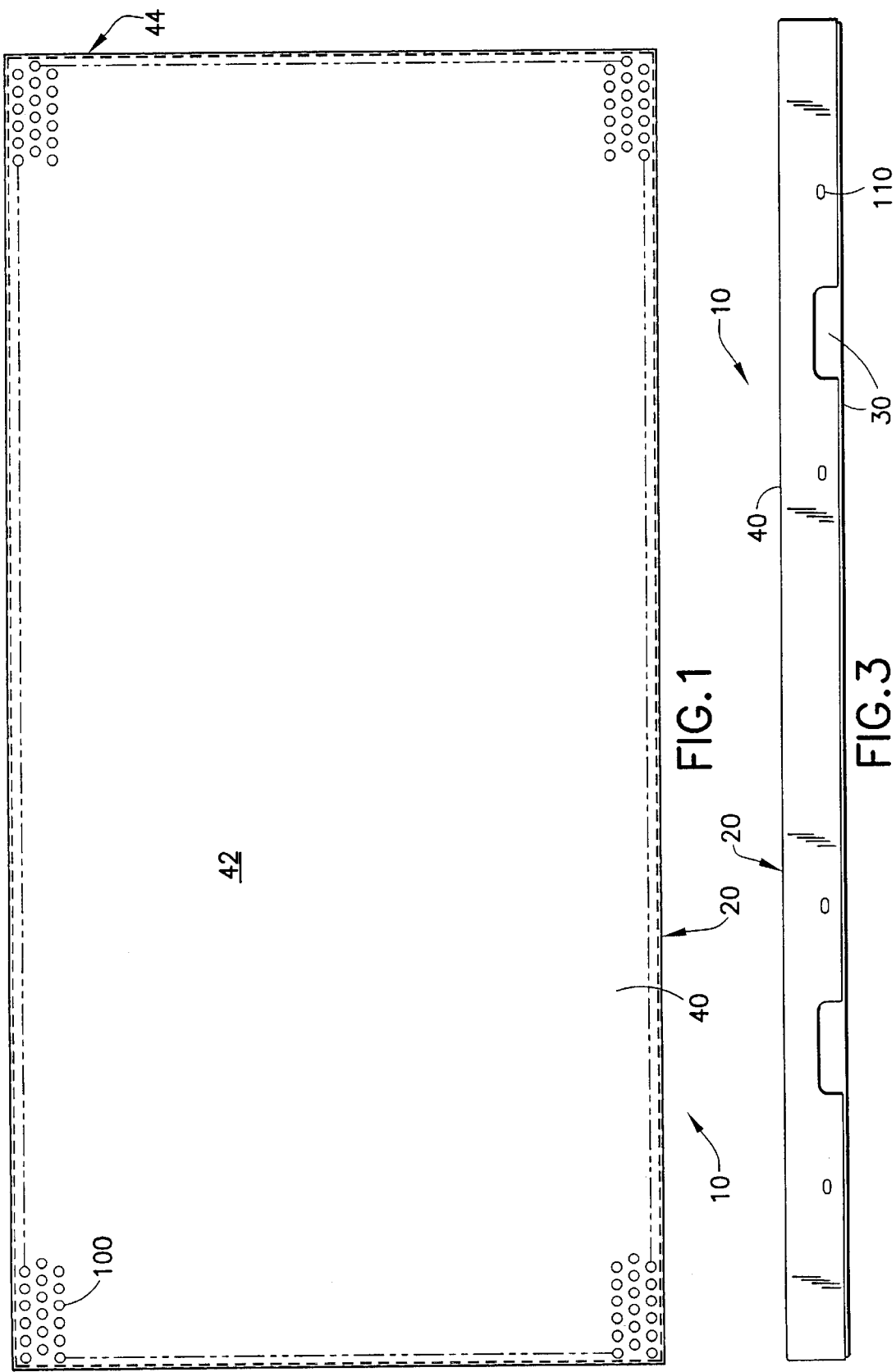

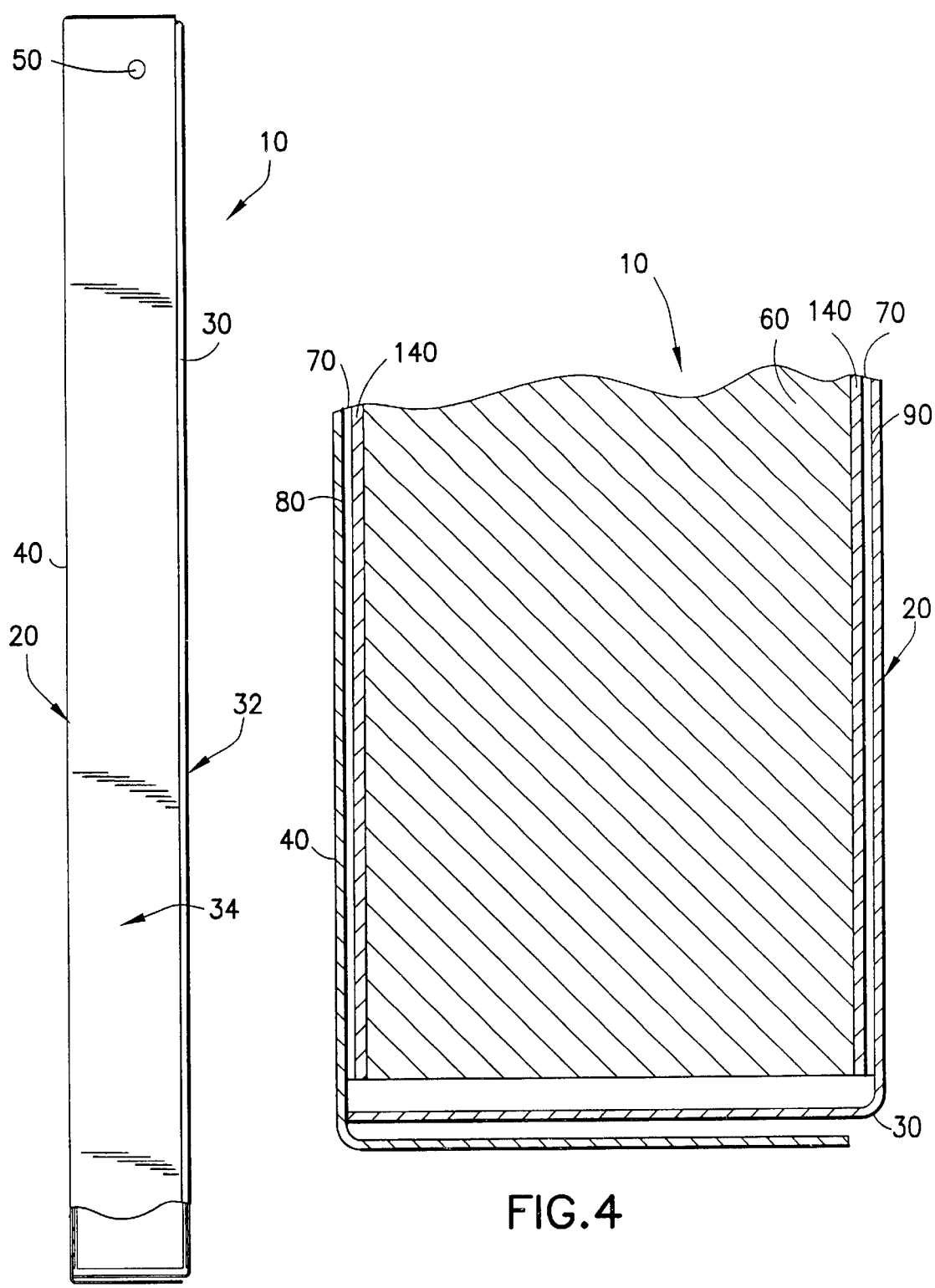

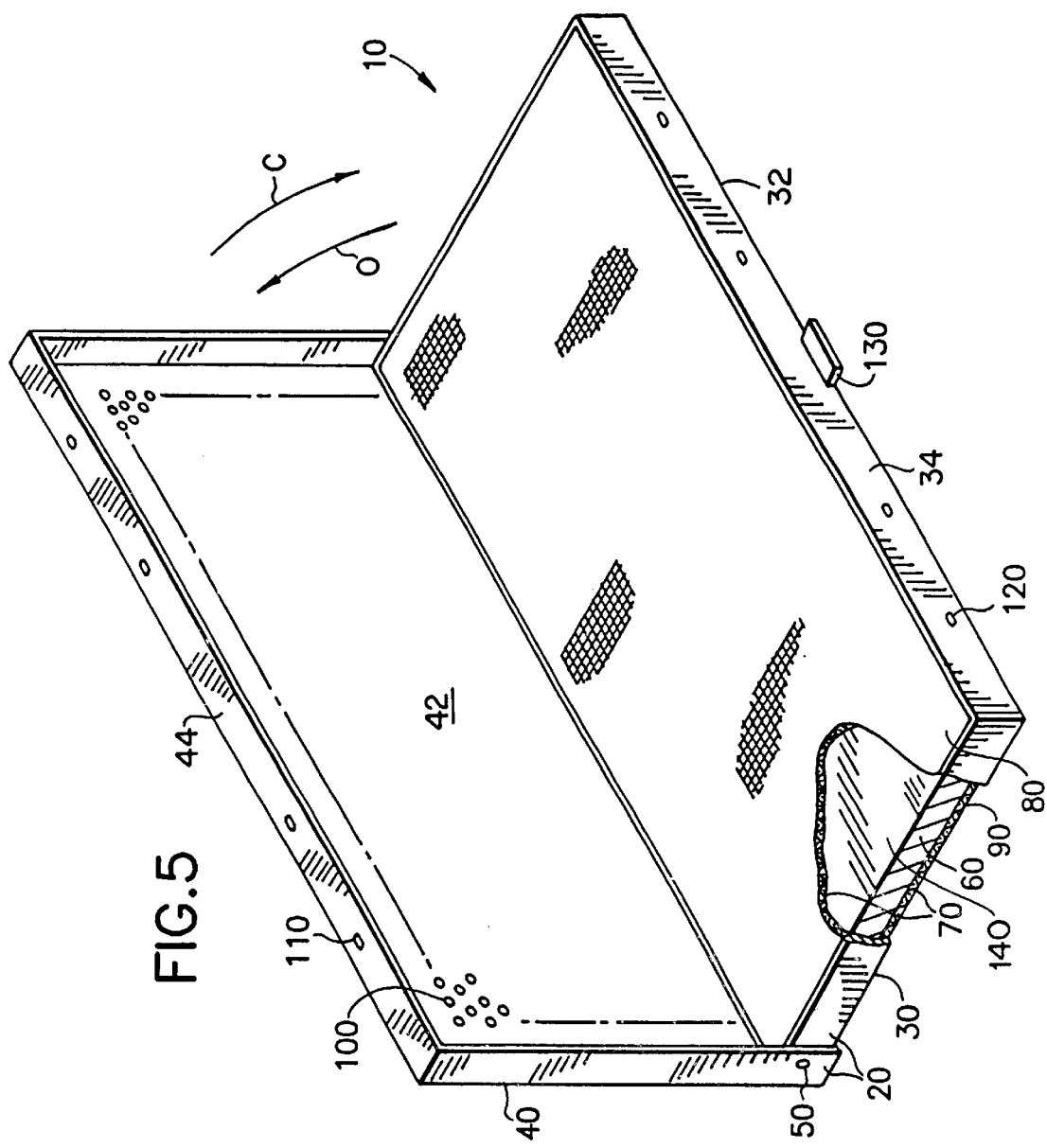

000
SOUND REDUCING PANEL FOR ANIMAL HOUSING ROOMS

FIELD OF THE INVENTION

The present invention relates to improvements in sound reducing systems, and more particularly, to a sound reducing system for use in rooms housing animals.

BACKGROUND OF THE INVENTION

Sound reducing systems are well known in the art. These devices generally consist of tiles made of sound absorbing material. The tiles are mounted on the ceiling and walls of rooms, and are used to reduce ambient reverberating room noise and provide for a quiet, pleasant environment.

The tiles of prior art sound reducing systems are usually constructed of a soft, easily broken, easily soiled material. When placed in rooms housing animals, these tiles are often damaged by coming into contact with animals and wheeled carts containing animals. Prior art sound reducing baffles are also usually made of liquid absorbing materials which become unhygienic when exposed to bodily secretions from animals or washing of the room surfaces. Once these fluids are absorbed by the prior art tile, there is no easy method for cleaning the tiles and they must be replaced. Thus, the prior art sound reducing systems are easily damaged and soiled. Once soiled, they are difficult to clean.

To overcome these shortcomings in the prior art, it is known to wrap the tiles in a protective barrier such as a plastic bag and hang the bag from hooks. However, the proposed protective bags quickly deteriorated. It is also known to place the bag in a metal housing and surrounding the bag with acoustic mesh. This protected the bag, however, the housing was closed with complex fasteners which are difficult to access, making cleansing or replacement of the sound reducing material difficult. The present invention is directed to overcoming the shortcomings in the prior art.

SUMMARY OF THE INVENTION

The present invention relates to an improved sound reducing system having a housing. An acoustic baffle disposed in the housing is encased by a water proof moisture protector. An acoustic netting is disposed on opposed sides of the encased baffle within the housing. The housing consists of an inner pan and an outer pan which are hingedly connected in a clam-shell type construction.

The pans are moveable between an open position and a closed position. When in the closed position, the housing protects the delicate acoustic baffle and acoustic netting within, and when in the open position, allows for the removal and cleaning of the acoustic baffle and acoustic netting.

Accordingly, it is an object of the invention to provide an improved sound reducing system which is easy to clean.

Yet another object of the invention is to provide a sound reducing system in which the delicate acoustic baffle and acoustic netting are protected from physical harm.

Still other objects and advantages of the invention will in part be obvious and will in part be apparent from the specification.

The invention accordingly comprises the features of construction, combination of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings in which:

FIG. 1 is a top plan view of a sound reducing system constructed in accordance with the present invention;

FIG. 2 is a side elevational view of a sound reducing system constructed in accordance with the present invention;

FIG. 3 is a front elevational view of a sound reducing system constructed in accordance with the present invention;

FIG. 4 is a partial front sectional view of a sound reducing system constructed in accordance with the present invention; and FIG. 5 is a perspective sectional view of a sound reducing system in an opened position, constructed in accordance with the present invention.

DETAILED DESCRIPTION OF A PREFERRED EMBODIMENT

Reference is made to FIGS. 1–5, wherein a sound reducing system, generally indicated as 10, includes a housing 20, an acoustic baffle 60, and an acoustic netting 70. Housing 20, includes an inner pan 30, and an outer pan 40, pivotally connected to each other. Inner pan 30 includes a bottom 32, and side walls 34 extend therefrom. Outer pan 40 includes a top 42, and side walls 44 extending therefrom. Inner pan 30 and outer pan 40, are formed with perforations 100 (shown in part for ease of description) extending across top and bottom surfaces 42, 32, which allow soundwaves to pass through housing 20.

A pivot 50 extends through side walls 34 and 44 to pivotally connect inner pan 30 to outer pan 40 so that they can pivot relative to each other between a closed and open position. At least a portion of side walls 44 is provided with locking dimples 110.

At least a corresponding portion of side walls 34 are provided with receiving recesses 120, for releasably receiving dimples 110 when housing 20 is in the closed position. A mounting member 130 which can be formed as brackets, eyelets, hooks or the like is formed on inner panel 30 for hanging or mounting to a kennel wall or ceiling. It should be understood Dimples 110, recesses 120 and mounting member 130 can be formed on either inner pan 30 or outer pan 40. By way of example, the protective enclosure is made of a metal, such as steel, and measures 2 feet wide by 4 feet deep by 2.25 inches high. Also by way of example, the acoustic baffle is made of sound absorbing fiberglass. The netting portions 70 work in conjunction with the acoustic baffle 60 to dampen room noise in a manner well known in the art. By way of example, the netting is formed of perforated, water resistant, plastic.

If animals are stored within the room which contains the sound reducing system, bodily secretions from the animals, as well a fluids such as water which are used to clean the animals, and rooms may be absorbed by prior art sound reducing systems. The acoustic baffle 60 of the present invention is encased within a waterproof casing 140, which may be made of a film, as a plastic bag of the like. The casing 140 prevents any foreign matter such as animal bodily fluids, or water, from being absorbed by, and damaging the acoustic baffle 60. A respective acoustic netting 70 is disposed within housing 20 adjacent each of bottom 32 and top 42. Acoustic baffle 60, encased in waterproof material 140 is disposed between acoustic nets 70 when housing 20 is in the closed position. Waterproof material 140 may be a film, plastic bag or the like which does not interfere with the acoustic properties of baffle 60.

When the sound reducing system is mounted on a ceiling or wall, sound energy within the room is absorbed by the acoustic netting 70 and acoustic baffle 60, in a manner that is well known in the art. When the sound reducing system is mounted on a ceiling (not shown) or wall (not shown) of a room, the protective enclosure 20 protects the acoustic baffle 60, and acoustic netting 70, from becoming damaged when coming in contact with animals, wheeled carts, and other objects within the room which might generally strike, and damage the delicate acoustic baffle 60 and acoustic netting 70.

During use, housing 20 is opened by rotating outer pan 40 in the direction of arrow 0 relative to inner pan 30. Acoustic net 70 is placed against bottom 32. Baffle 60 encased in waterproof casing 140 is placed in lower pan 30. A second acoustic net 70 is placed on baffle 60 and outer pan 40 is rotated in the direction of arrow C into the closed state. The acoustic baffle 60 may be removed from housing 20 by moving the outer pan 40 about pivots 50, in the direction of arrow O, as depicted in FIG. 5. With the protective housing 20 in the opened position, the acoustic baffle 60 may be removed for cleaning, and then placed back into the protective enclosure 20, which is then closed by moving the outer pan 40 about pivots 50 in the direction arrow C. When protective enclosure 20 is in the closed position, the outer pan securing dimples 110 are received within the inner pan securing recesses 120, thus securing the protective enclosure in the closed position. To open, dimples 110 slide from recesses 120 when force is applied to open the housing.

By providing a clamshell housing to protect the acoustic baffle and netting, the sound absorbing acoustic baffle 60 and acoustic netting 70, can be easily removed from the protective enclosure 20, cleaned, and then replaced.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall there between.

What is claimed is:

1. A sound reducing system comprising:

a housing, said housing including an inner pan and an outer pan; said outer pan being pivotally connected to said inner pan; said inner pan and said outer pan being perforated;

an acoustic baffle; said acoustic baffle being disposed within said housing; and acoustic netting; said acoustic netting including at least a first acoustic net being disposed within said housing between said acoustic baffle and one of said outer pan and said inner pan;

wherein said acoustic baffle is encased in a water resistant moisture protector.

2. The sound reducing system of claim 1, wherein locking dimples are disposed on one side of said inner pan and said outer pan and receiving recesses are disposed on one of the other of said inner pan and outer pan to receive said dimples.

3. The sound reducing system of claim 1, wherein said acoustic netting includes a first net and a second net.

* * * * *